US010312520B2

(12) United States Patent
Kinoshita et al.

(10) Patent No.: US 10,312,520 B2
(45) Date of Patent: Jun. 4, 2019

(54) NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Koji Kinoshita, Toyota (JP); Tatsuya Hashimoto, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 98 days.

(21) Appl. No.: 15/079,994

(22) Filed: Mar. 24, 2016

(65) Prior Publication Data

US 2016/0293940 A1 Oct. 6, 2016

(30) Foreign Application Priority Data

Apr. 6, 2015 (JP) ................. 2015-077378

(51) Int. Cl.
*H01M 4/36* (2006.01)
*H01M 4/62* (2006.01)
*H01M 4/13* (2010.01)
*H01M 4/02* (2006.01)

(52) U.S. Cl.
CPC ............ *H01M 4/621* (2013.01); *H01M 4/13* (2013.01); *H01M 4/624* (2013.01); *H01M 2004/021* (2013.01)

(58) Field of Classification Search
CPC ........ H01M 4/621; H01M 4/624; H01M 4/13; H01M 2004/021; H01M 2004/027
See application file for complete search history.

(56) References Cited

U.S. PATENT DOCUMENTS

| 7,972,535 | B2* | 7/2011 | Hoshiba | H01G 11/38 |
| | | | | 252/500 |
| 2006/0068272 | A1* | 3/2006 | Takami | B60L 3/0046 |
| | | | | 429/62 |
| 2007/0275302 | A1 | 11/2007 | Sotowa et al. | |
| 2011/0027657 | A1 | 2/2011 | Nishinaka et al. | |
| 2012/0231332 | A1* | 9/2012 | Kose | H01M 4/13 |
| | | | | 429/211 |
| 2013/0209876 | A1* | 8/2013 | Kang | H01M 4/131 |
| | | | | 429/211 |

FOREIGN PATENT DOCUMENTS

| CN | 100541870 C | 9/2009 |
| CN | 101986452 A | 3/2011 |
| JP | 11-312525 A | 11/1999 |
| JP | 2000-040504 A | 2/2000 |
| JP | 2004-319312 A | 11/2004 |

(Continued)

*Primary Examiner* — Osei K Amponsah
(74) *Attorney, Agent, or Firm* — Sughrue Mion, PLLC

(57) ABSTRACT

According to the invention, a non-aqueous electrolyte secondary battery including a positive electrode, a negative electrode, and a non-aqueous electrolyte is provided. The negative electrode contains a negative electrode active material, a conductive material, and a binder. When an average particle size of the conductive material is referred to as De, and an average particle size of the binder is referred to as Db, Db≤De is satisfied. In other words, the average particle size Db of the binder is equal to or smaller than the average particle size De of the conductive material.

3 Claims, 3 Drawing Sheets

(56) References Cited

FOREIGN PATENT DOCUMENTS

| JP | 2007273639 A | 10/2007 |
| JP | 2008016456 A | 1/2008 |
| JP | 2010033803 A | 2/2010 |
| JP | 2010218848 A | 9/2010 |
| JP | 2011029079 A | 2/2011 |

* cited by examiner

NON-AQUEOUS ELECTROLYTE SECONDARY BATTERY

INCORPORATION BY REFERENCE

The disclosure of Japanese Patent Application No. 2015-077378 filed on Apr. 6, 2015 including the specification, drawings and abstract is incorporated herein by reference in its entirety.

BACKGROUND OF THE INVENTION

1. Field of the Invention

The invention relates to a non-aqueous electrolyte secondary battery, and more particularly, to a non-aqueous electrolyte secondary battery provided with a conductive material in a negative electrode.

2. Description of Related Art

A non-aqueous electrolyte secondary battery such as a lithium-ion secondary battery may contain a conductive material in an electrode (positive electrode and/or negative electrode) for the purpose of the enhancement of electron conductivity. Documents associated with the related art include Japanese Patent Application Publication No. 11-312525 (JP 11-312525 A) and Japanese Patent Application Publication No. 2000-040504. For example, in JP 11-312525 A, a negative electrode which contains a negative electrode active material, a conductive material, and a binder, the conductive material satisfying the following conditions in which (1) the conductive material is obtained by crushing expanded graphite and (2) the median particle size is greater than that of the negative electrode active material, and a non-aqueous electrolyte battery provided with the negative electrode are disclosed.

SUMMARY OF THE INVENTION

However, according to investigation by the inventors, in the configuration of JP 11-312525 A, as a counter-effect of the enhancement of electron conductivity, durability (capacity retention ratio) may be reduced. That is, in the configuration of JP 11-312525 A, reductive decomposition of the non-aqueous electrolyte on the surface of the conductive material contained in the negative electrode may be accelerated. As a result, irreversible capacity may increase, and the degree of capacity deterioration may increase. The invention provides a non-aqueous electrolyte secondary battery, which is a battery provided with a conductive material in a negative electrode and has excellent input and output characteristics and high durability (good cycle characteristics).

The inventors considered suppressing the decomposition of a non-aqueous electrolyte, which causes irreversible capacity. As a result of extensive investigation, the invention was completed. According to the invention, a non-aqueous electrolyte secondary battery which includes a positive electrode, a negative electrode, and a non-aqueous electrolyte is provided. The negative electrode contains a negative electrode active material, a conductive material, and a binder. In addition, Db≤De is satisfied where the average particle size of the conductive material is De, and the average particle size of the binder is Db. In other words, the average particle size Db of the binder is equal to or smaller than the average particle size De of the conductive material.

In the above configuration, the surface of the conductive material is appropriately covered with the binder. Accordingly, the contact area between the conductive material and the non-aqueous electrolyte is reduced, and thus reductive decomposition of the non-aqueous electrolyte that occurs on the surface of the conductive material is suppressed. As a result, the effect of the addition of the conductive material is sufficiently exhibited, and the enhancement of electron conductivity (a reduction in resistance) and the enhancement of capacity retention ratio can be compatible. Therefore, a non-aqueous electrolyte secondary battery which has both of excellent input and output characteristics and high durability can be realized.

In the specification, if not particularly defined, "particle size" refers to a particle size (primary particle size) measured through measurement of particle size distributions based on a dynamic light scattering method (detection method, FFT-heterodyne method). In addition, "average particle size" refers to a particle size (median diameter, $D_{50}$ particle size) corresponding to a cumulative 50% point from a small particle size side in a volume-based particle size distribution obtained through measurement of particle size distributions.

In an aspect of the non-aqueous electrolyte secondary battery disclosed herein, the average particle size of the binder may be 90 nm or smaller. Accordingly, better durability (for example, high-temperature storage characteristics) can be realized.

In an aspect of the non-aqueous electrolyte secondary battery disclosed herein, Db and De may satisfy (Db/De) ≤0.9. Accordingly, the effects of the invention are more reliably exhibited.

In an aspect of the non-aqueous electrolyte secondary battery disclosed herein, the negative electrode may include a negative electrode current collector and a negative electrode active material layer. The negative electrode active material layer may contain the negative electrode active material, the conductive material, and the binder. A peel strength between the negative electrode current collector and the negative electrode active material layer is 4 N/m or higher. Accordingly, the mechanical strength (shape retainability) of the negative electrode can be enhanced. That is, against stress applied during manufacturing or use of a battery or expansion and contraction of the negative electrode active material due to charging and discharging operations, high durability can be realized. In the specification, "peel strength" refers to the peel strength (tensile strength) obtained in a 90-degree peel test based on JIS-K 6854-1 (1999).

According to the invention, a negative electrode for a non-aqueous electrolyte secondary battery may be provided. The negative electrode contains a negative electrode active material, a conductive material, and a binder. In addition, Db≤De is satisfied where the average particle size of the conductive material is De, and the average particle size of the binder is Db. In other words, the average particle size Db of the binder is equal to or smaller than the average particle size De of the conductive material.

In an aspect of the non-aqueous electrolyte secondary battery disclosed herein, a mass ratio between the conductive material and the binder may be 4:1 to 6:1. Accordingly, the surface of the conductive material is more reliably coated with the binder. That is, since the surface of a portion of the conductive material is covered with the binder, reductive decomposition of the non-aqueous electrolyte is more reliably suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
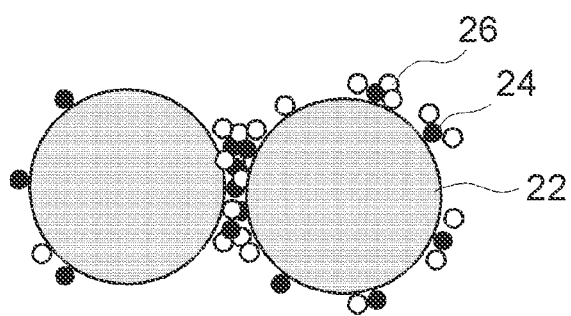
FIG. 1 is a partial schematic view illustrating the configuration of a negative electrode according to an embodiment of the invention.

Hereinafter, exemplary embodiments of the invention will be described with reference to the appropriate drawings. In the following drawings, like members or portions having the same function are denoted by like reference numerals, and overlapping description will be omitted or simplified. In each of the drawings, the dimensional relationships (length, width, thickness, and the like) do not necessarily reflect actual dimensional relationships. In addition, items which are not items that are particularly mentioned in the specification and are necessary items for the implementation of the invention (general techniques related to the configuration of a battery, for example, the configuration and manufacturing method of a positive electrode, the configuration and manufacturing method of a separator, the configuration and manufacturing method of a non-aqueous electrolyte, and the shape of a battery (case)) can be recognized as design items by those skilled in the related art in the corresponding field. The invention can be implemented on the basis of the contents disclosed in the specification and general technical knowledge in the corresponding field.

<Non-Aqueous Electrolyte Secondary Battery>

A non-aqueous electrolyte secondary battery disclosed herein includes (a) a positive electrode, (b) a negative electrode, and (c) a non-aqueous electrolyte. Hereinafter, each of the constituent elements included in the battery will be described.

<(a) Positive Electrode>

The positive electrode typically includes a positive electrode current collector, and a positive electrode active material layer fixed onto the positive electrode current collector. The positive electrode active material layer contains a positive electrode active material. As the positive electrode current collector, a conductive member made of metal with good conductivity (for example, aluminum or nickel) is appropriate. The shape of the positive electrode current collector varies depending on the shape of the battery or the like and is thus not particularly limited. Shapes such as a bar shape, plate shape, sheet shape, foil shape, or mesh shape may be employed. The thickness of the positive electrode current collector is not particularly limited, and may be, for example, 5 μm to 30 μm.

As the positive electrode active material, one type or two or more types of various materials which are known to be used as a positive electrode active material of a non-aqueous electrolyte secondary battery may be employed without particular limitations. A typical example thereof includes a lithium-transition metal complex compound which contains lithium (Li) and at least one type of transition metal elements. Representative examples of the lithium-transition metal complex compound include complex oxides which contain at least one of lithium (Li), nickel (Ni), cobalt (Co), and manganese (Mn). Specifically, $LiNiO_2$, $LiCoO_2$, $LiFeO_2$, $LiMn_2O_4$, $LiNi_{0.33}Co_{0.33}Mn_{0.33}O_2$, $LiNi_{0.5}Mn_{1.5}O_4$, and the like are exemplified. Among the materials, from the viewpoint of the enhancement of thermal stability and energy density, a ternary lithium-transition metal complex oxide which contains Li, Ni, Co, and Mn is preferable.

The positive electrode active material layer may include, in addition to the above-mentioned positive electrode active material, other arbitrary components (for example, a binder, a conductive material, a dispersant, a thickener, and the like) as necessary. As the conductive material, for example, a carbon material such as carbon black, activated carbon, graphite, and carbon fibers may be appropriately employed. In addition, metallic fibers, metal powders such as copper powder or nickel powder, and an organic conductive material such as a polyphenylene derivative may be appropriately employed. As the binder, for example, a vinyl halide resin such as polyvinylidene fluoride (PVdF), and polyalkylene oxide such as polyethylene oxide (PEO) may be appropriately employed.

<(b) Negative Electrode>

The negative electrode contains (b1) a negative electrode active material, (b2) a conductive material, and (b3) a binder. The negative electrode typically includes a negative electrode current collector, and a negative electrode active material layer fixed onto the negative electrode current collector. The (b1) to (b3) described above are contained in the negative electrode active material layer. The negative electrode having the above configuration is produced, for example, by the following method. First, the negative electrode active material, the conductive material, and the binder are mixed with an appropriate solvent, thereby preparing a paste-like negative electrode active material layer formation composition (negative electrode paste). As the solvent, any of an aqueous solvent and an organic solvent may be used, and for example, water may be used. Next, the prepared negative electrode paste is applied to the negative electrode current collector, and the solvent contained in the negative electrode paste is removed. The composition from which the solvent is removed is compressed (pressed) as necessary to achieve a desired thickness and coating amount. In this manner, the negative electrode provided with the negative electrode active material layer on the negative electrode current collector is obtained.

The negative electrode of the battery disclosed herein is characterized in that, Db≤De is satisfied where the average particle size of the conductive material is De and the average particle size of the binder is Db. FIG. 1 is a partial schematic view illustrating the configuration of the negative electrode (typically the negative electrode active material layer) according to the embodiment. As illustrated in FIG. 1, in the negative electrode which satisfies the relational expression (Db≤De), the surface of a portion of a conductive material 24 is covered with a binder 26. Accordingly, the contact area between the conductive material 24 and the non-aqueous electrolyte is reduced. In addition, reductive decomposition of the non-aqueous electrolyte that occurs on the surface of the conductive material 24 is suppressed. In addition, the conductive material 24, which is partially covered with the binder 26, is present between the negative electrode active materials 22. Accordingly, a good conducting path is formed in the negative electrode active material layer, and the mechanical strength (shape retainability) of the negative electrode can be enhanced. As a result, the enhancement of electron conductivity (a reduction in resistance) and the enhancement of capacity retention ratio can be compatible.

According to the investigation by the inventors, in a case where Db and De have the relationship of Db>De (for example, in a case where the binder having an average particle size of about 150 nm to 300 nm and the conductive material having an average particle size of about 100 nm are used), the surface of the conductive material is less likely to be coated with the binder. Therefore, during the preparation of the negative electrode paste, the binder may become lumps or coagulate in the solvent. When the binder coagulates, the particle size thereof increases. Therefore, when the negative electrode paste is applied onto the negative electrode current collector and is dried, the binder having a large particle size does not penetrate a portion between the negative electrode active materials and is deposited on the surface of the negative electrode active material. On the other hand, the conductive material having a smaller particle size than that of the binder preferentially fills the gap between the negative electrode active materials. As a result, the surface of the conductive material which is present between the negative electrode active materials is in a state of being exposed. Accordingly, reductive decomposition of the non-aqueous electrolyte occurs on the surface of the conductive material, and irreversible capacity increases. As a result, capacity deterioration becomes significant as charge-discharge cycles are repeated.

In an appropriate aspect of the technique disclosed herein, Db and De satisfy (Db/De)<1, preferably (Db/De)≤0.9, and more preferably (Db/De)≤0.8. Accordingly, the difference in particle size between the conductive material and the binder becomes significant. As a result, the surface of the conductive material is easily covered with the binder. Therefore, the effect of the enhancement of the capacity retention ratio is more reliably exhibited. In another appropriate aspect, Db and De satisfy 0.05≤(Db/De), typically 0.1≤(Db/De), and for example, 0.5≤(Db/De). Accordingly, a reduction in the battery resistance and the enhancement of durability can be realized to a higher level. Hereinafter, the constituent elements of the negative electrode will be described.

As the negative electrode current collector, a conductive member made of metal with good conductivity (for example, copper or nickel) is appropriate. The shape of the negative electrode current collector varies depending on the shape of the battery or the like and is thus not particularly limited. Shapes such as a bar shape, plate shape, sheet shape, foil shape, or mesh shape may be employed. The thickness of the negative electrode current collector is not particularly limited, and may be, for example, 5 µm to 30 µm.

(b1) As the negative electrode active material, one type or two or more types of various materials which are known to be used as a negative electrode active material of a non-aqueous electrolyte secondary battery may be employed without particular limitations. A typical example thereof includes a carbon material. Representative examples of the carbon material include graphite, and amorphous carbon coated graphite having amorphous carbon on the surface of graphite. Furthermore, depending on the use of the battery or the like, an oxide of lithium titanate or the like, and a single substance, alloy, or compound of a silicon material, tin material, or the like are appropriate as the negative electrode active material. Among the materials, a graphite-based carbon material in which graphite occupies 50 mass % or more (typically 80 mass % or more, and preferably 90 mass % or more) with respect to the entire negative electrode active material is preferable. Accordingly, the enhancement of energy density and high durability can be compatible at a high level.

The negative electrode active material is typically in the form of particles (powder). The average particle size (secondary particle size) of the negative electrode active material based on a laser diffraction/light scattering method is greater than that of the conductive material and the binder, and is typically about 1 µm to 20 µm, and for example, about 5 µm to 15 µm. By allowing the average particle size of the negative electrode active material to be a predetermined value or smaller, a field in which the material reacts with charge carriers is appropriately ensured. As a result, the resistance is more reliably reduced, and better input and output characteristics can be realized. In addition, by allowing the average particle size of the negative electrode active material to be a predetermined value or greater, the reductive decomposition of the non-aqueous electrolyte that occurs on the surface of the negative electrode active material is more reliably suppressed. As a result, an increase in irreversible capacity is suppressed, and a higher capacity retention ratio can be realized.

(b2) As the conductive material, various materials used for the electrodes of a non-aqueous electrolyte secondary battery in the related art may be specially employed. Typical examples thereof include, carbon black, carbon fibers, activated carbon, hard carbons, soft carbons, and amorphous carbon such as diamond-like carbon (DLC). Representative examples of the carbon black include acetylene black (AB), furnace black, Ketjen black, channel black, lamp black, and thermal black. Among the materials, from the viewpoint of a high degree of the compatibility between low resistance and high capacity, acetylene black is preferable.

The conductive material used herein is in the form of particles (powder). The average particle size De (primary particle size) of the conductive material is not particularly limited as long as it is equal to or greater than the average particle size Db of the binder (as long as Db≤De is satisfied). In an appropriate aspect, De is approximately 60 nm or greater, and for example, 70 nm or greater. When De is equal to or higher than a predetermined value, bulk density can be suppressed to be relatively low. Therefore, this is advantageous from the viewpoint of the realization of high energy density. When De is equal to or higher than the predetermined value, there is an effect of forming a thick (stronger) conducting path between the negative electrode active materials. Therefore, the resistance of the negative electrode can be reduced by a higher level. In another appropriate aspect, De is approximately 200 nm or smaller, typically 150 nm or smaller, and for example, 100 nm or smaller. When De is equal to or lower than a predetermined value, the specific surface area of the conductive material per unit mass increases. Therefore, the contact area between the negative electrode active materials increases, thereby facilitating the formation of the conducting path in the negative electrode. Accordingly, the resistance of the negative electrode can be reduced by a higher level.

(b3) As the binder, various materials that are used in the electrodes of a non-aqueous electrolyte secondary battery in the related art may be specially employed. Typical examples thereof include: an acrylic polymer which contains an acrylic acid, a methacrylic acid, an acrylic acid ester, or methacrylic acid ester as a primary copolymerization component; rubbers such as styrene-butadiene rubber (SBR), acrylonitrile-butadiene copolymer rubber (NBR), acrylonitrile-isoprene copolymer rubber (NIR), and acrylonitrile-butadiene-isoprene copolymer rubber (NBIR); a polyolefin-based polymer such as polyethylene; a urethane-based polymer such as polyurethane; a fluorine-based resin such as polyvinylidene fluoride (PVdF) or polytetrafluoroethylene (PTFE); and a polyalkylene oxide such as polyethylene oxide (PEO). Among the materials, an acrylic polymer has strong adhesion (typically initial tackiness and adhesion strength) and high electrochemical stability and is thus preferable.

The binder used herein is in the form of particles (powder). The average particle size Db (primary particle size) of the binder is not particularly limited as long as it is equal to or smaller than the average particle size De of the conductive material (Db≤De is satisfied). In an appropriate aspect, Db is approximately 60 nm or greater, and for example, 70 nm or greater. When Db is equal to or higher than a predetermined value, coagulation of the binder can be appropriately suppressed during the preparation of the negative electrode paste. In addition, the ease of manufacturing and handling properties of the binder itself can be enhanced. As a result, productivity is enhanced, and a reduction in cost can be realized. In another appropriate aspect, Db is approximately 150 nm or smaller, typically 100 nm or smaller, and preferably 90 nm or smaller. When Db is equal to or lower than a predetermined value, the specific surface area thereof per unit mass increases. Therefore, the surface the conductive material can be more reliably covered with the binder. As a result, the contact area between the conductive material and the non-aqueous electrolyte is reliably reduced, and the reductive decomposition of the non-aqueous electrolyte is suppressed. In addition, when the particle size of the binder is small, the binder easily penetrates a portion between the negative electrode active materials. Therefore, the adhesion between the negative electrode active materials can be increased, and thus the mechanical strength can be enhanced. Therefore, when Db is equal to or lower than the predetermined value, the effect of the invention can be exhibited to a higher level.

The mass ratio between the conductive material and the binder in the negative electrode is not particularly limited, and may be approximately 1:1 to 10:1, and for example, 4:1 to 6:1. Accordingly, the surfaces of conductive material can be more reliably covered with the binder. That is, since the surface of a portion of the conductive material is covered with the binder, the reductive decomposition of the non-aqueous electrolyte is more reliably suppressed. As a result, even in an environment at a high temperature at which decomposition of the non-aqueous electrolyte easily occurs, capacity deterioration can be highly reduced. In addition, a portion (exposed portion) of the surface of the conductive material, which is not covered with the binder, remains, and a good conducting path is more reliably formed in the negative electrode. As a result, the resistance of the negative electrode can be reduced by a high level.

The negative electrode active material layer may contain various additives (for example, thickener, dispersant, and the like) as necessary as long as the effects of the invention are not significantly damaged. The thickener has a function of imparting appropriate viscosity to the negative electrode slurry. Specific examples include celluloses such as carboxymethylcellulose (CMC) and methylcellulose (MC).

The ratio of the negative electrode active material to the entire negative electrode active material layer is typically higher than 50 mass %, is preferably 90 mass % to 99 mass %, and may be, for example, 90 mass % to 95 mass % from the viewpoint of the realization of high energy density. The ratio of the conductive material to the entire negative electrode active material layer is approximately 1 mass % to 10 mass %, is preferably 1 mass % to 7 mass %, and may be, for example, 5±1 mass % from the viewpoint of the balance between the energy density and input and output characteristics. The ratio of the binder to the entire negative electrode active material layer is approximately 0.1 mass % to 5 mass %, is preferably 0.5 mass % to 3 mass %, and may be, for example, 1 mass % to 2 mass % from the viewpoint of the balance between the maintenance of mechanical strength (shape retainability) and low resistance.

The coating amount of the negative electrode active material layer per unit area (the amount of the applied negative electrode paste in terms of solid content) is not particularly limited. In an appropriate aspect, the coating amount of the negative electrode active material layer per unit area for one surface of the negative electrode current collector is 2 mg/cm$^2$ or more, for example, 3 mg/cm$^2$ or more, and typically 3.5 mg/cm$^2$ or more. Accordingly, a battery with high energy density can be more reliably realized. In another appropriate aspect, the coating amount of the negative electrode active material layer per unit area for one surface of the negative electrode current collector is 5.2 mg/cm$^2$ or less, for example, 5 mg/cm$^2$ or less, and typically 4.5 mg/cm$^2$ or less. According to investigation by the inventors, in a case where the average particle size of the binder is small, during the manufacturing of the negative electrode (more specifically, when the negative electrode paste is applied onto the negative electrode current collector and is dried), binder migration (non-uniform distribution) easily occurs on the surface layer portion of the negative electrode active material layer. By allowing the coating amount to be equal to or lower than the predetermined value, the above-described problem can be effectively suppressed.

The density of the negative electrode active material layer when the battery is constructed (after the pressing is performed) is not particularly limited. In an appropriate aspect, from the viewpoint of the compatibility between high energy density and high input and output density, the density of the negative electrode active material layer is 1.1 g/cm$^3$ or higher, typically 1.2 g/cm$^3$ or higher, for example, 1.3 g/cm$^3$ or higher, and typically 1.5 g/cm$^3$ or lower. Accordingly, high energy density and high input and output density can be compatible at a high level.

In an appropriate aspect, the peel strength between the negative electrode current collector and the negative electrode active material layer is approximately 2 N/m or higher, preferably 3.5 N/m or higher, and more preferably 4 N/m or higher. Particularly for use that requires strength, the peel strength may be 5 N/m or higher. Accordingly, the mechanical strength (shape retainability) of the negative electrode can be enhanced. That is, when the peel strength is high, even when the negative electrode active material repeats expansion and contraction due to stress applied during manufacturing or use of a battery or due to charging and discharging operations, the negative electrode active material layer is less likely to peel off or collapse. Therefore, a highly durable battery can be stably realized. In addition, a specific sequence of a peel test will be described in Examples.

<(c) Non-Aqueous Electrolyte>

The non-aqueous electrolyte generally contains a support salt and a non-aqueous solvent. The non-aqueous electrolyte is in a liquid state, for example, at room temperature (25° C.±5° C.), and is thus a non-aqueous electrolytic solution. Preferably, the non-aqueous electrolyte is always in a liquid state in a battery use temperature range (for example, −30 to +60° C.). As the support salt, one type or two or more types of various compounds which are known to be used as a support salt of a non-aqueous electrolyte secondary battery may be employed without particular limitations. Appropriate examples thereof include lithium salts such as $LiPF_6$, $LiBF_4$, $LiCF_3SO_3$, and $LiClO_4$. Among the materials, $LiPF_6$ or $LiBF_4$ is preferable. As the non-aqueous solvent, one type or two or more types of various organic solvents which are known to be used as a non-aqueous solvent of a non-aqueous electrolyte secondary battery may be employed without particular limitations. Specific examples thereof include carbonates, ethers, esters, nitriles, sulfones, and lactones. Appropriate examples include carbonates such as ethylene carbonate (EC), propylene carbonate (PC), diethyl carbonate (DEC), dimethyl carbonate (DMC), and ethyl methyl carbonate (EMC).

The non-aqueous electrolyte may contain various additives as necessary, as well as the support salt and the non-aqueous solvent described above. The additives may be used for one or two or more purposes such as the enhancement of cycle characteristics of a battery, the enhancement of high-temperature storage characteristics, the enhancement of initial charging and discharging efficiency, the enhancement of input and output characteristics, and the enhancement of overcharge tolerance (an increase in the amount of gas generated during overcharge). Appropriate examples thereof include: film forming agents such as lithium bis(oxalato)borate (LiBOB), lithium difluoro(oxalato)borate, vinylene carbonate (VC), and vinyl ethylene carbonate (VEC); and overcharge additives such as biphenyl (BP) and cyclohexylbenzene (CHB).

<Embodiment of Non-Aqueous Electrolyte Secondary Battery>

Figure 2:
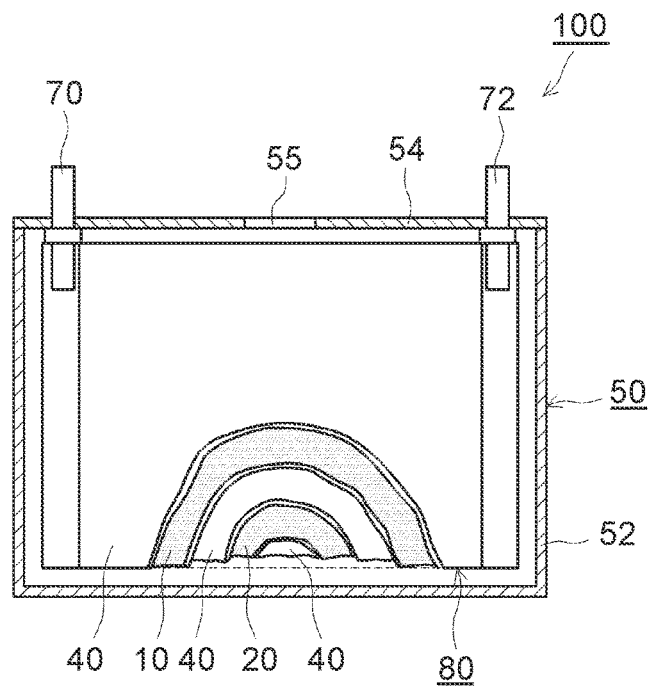
FIG. 2 is a schematic view illustrating the sectional structure of a non-aqueous electrolyte secondary battery according to the embodiment of the invention.

FIG. 2 is a longitudinal sectional view of a non-aqueous electrolyte secondary battery (single cell) 100 according to the embodiment of the invention. The non-aqueous electrolyte secondary battery 100 includes a wound electrode body 80 having a flat shape, a non-aqueous electrolyte (not illustrated), and a battery case 50 having a flat rectangular parallelepiped shape to accommodate the wound electrode body 80 and the non-aqueous electrolyte. The battery case 50 includes a battery case body 52 having a flat rectangular parallelepiped shape with an open upper end, and a cover 54 which blocks the opening. The material of the battery case 50 may be, for example, a light metal such as aluminum. The shape of the battery case is not particularly limited, and may be a rectangular parallelepiped shape, a cylindrical shape, or the like. The upper surface (that is, the cover 54) of the battery case 50 is provided with a positive electrode terminal 70 and a negative electrode terminal 72 for external connection. Portions of the terminals 70, 72 protrude toward the surface side of the cover 54. The positive electrode terminal 70 is electrically connected to the positive electrode of the wound electrode body 80 on the battery case 50 side. The negative electrode terminal 72 is electrically connected to the negative electrode of the wound electrode body 80 on the battery case 50 side. The cover 54 is also provided with a safety valve 55 for discharging gas generated inside the battery case 50 toward the outside.

The wound electrode body 80 includes a long positive electrode sheet 10 and a long negative electrode sheet 20. The positive electrode sheet 10 includes a long positive electrode current collector, and a positive electrode active material layer formed on a surface (typically both surfaces) thereof along a longitudinal direction thereof. The negative electrode sheet 20 includes a long negative electrode current collector, and a negative electrode active material layer formed on a surface (typically both surfaces) thereof along a longitudinal direction thereof. The wound electrode body 80 includes two long separator sheets 40. The positive electrode sheet 10 (the positive electrode active material layer) and the negative electrode sheet 20 (the negative electrode active material layer) are insulated from each other by the separator sheets 40. The material of the separator sheet 40 may be a resin such as polyethylene (PE), polypropylene (PP), polyesters, cellulose, and polyamide. The surface of the separator sheet 40 may be provided with a porous heat-resistant layer containing inorganic compound particles (inorganic filler) for the purpose of preventing an internal short circuit or the like. The wound electrode body 80 has a flat shape, and for example, depending on the shape of the battery or uses, appropriate shapes and configurations may be employed.

<Uses of Non-Aqueous Electrolyte Secondary Battery>The non-aqueous electrolyte secondary battery disclosed herein can be used for various uses, and realizes low resistance and high durability (for example, excellent high-temperature storage characteristics) due to the effects of the optimization of the configuration of the negative electrode. Therefore, the battery can maintain high energy density and high input and output density over a long period of time. The non-aqueous electrolyte secondary battery disclosed herein with the above-described characteristics can be particularly preferably used, for example, for a use in which repeated rapid charge and discharge cycles are postulated, a use in which continuous use for about 10 years without replacement is considered, and a use in which the use environment or storage environment is at a high temperature of 50° C. or higher. Specifically, the non-aqueous electrolyte secondary battery can be preferably used as a power source (drive power source) for a motor mounted in a vehicle such as a hybrid vehicle (HV). Therefore, according to the invention, a vehicle in which any non-aqueous electrolyte secondary battery disclosed herein (which may be in the form of an assembled battery having a plurality of connected batteries) is mounted is provided.

Hereinafter, several examples related to the invention are described, and are not intended to limit the invention to the specific examples.

I. Evaluation of Battery Characteristics

<Production of Positive Electrode>

First, a ternary lithium-transition metal complex oxide ($LiNi_{1/3}Co_{1/3}Mn_{1/3}O_2$) as the positive electrode active material, acetylene black (AB) as the conductive material, polyvinylidene fluoride (PVdF) as the binder were weighed to have a mass ratio of 91:6:3, and were mixed with N-methylpyrrolidone (NMP), thereby preparing a positive electrode paste. The prepared positive electrode paste was applied to a long aluminum foil (positive electrode current collector) in a band shape. This was heated, dried, and then subjected to roll press, thereby producing a positive electrode sheet.

<Production of Negative Electrode>

First, amorphous carbon coated graphite having a structure in which the surface of graphite was coated with amorphous carbon was produced as the negative electrode active material. Specifically, natural graphite powder and pitch were mixed to have a mass ratio of 95:5 to cause the pitch to adhere to the surface of natural graphite. This was baked at approximately 1000° C. in an inert gas atmosphere, and was sifted, thereby obtaining amorphous carbon coated graphite having an average particle size of 10 μm. In addition, acrylic binders (five types, all of which are in an emulsion state containing a dispersion medium) having an average particle size of 70 nm to 300 nm were prepared as the binder.

Next, the amorphous carbon coated graphite produced above, acetylene black (AB) as the conductive material, carboxymethylcellulose (CMC) as the thickener, and the five types of acrylic binders were weighed to have the following mass ratios, and were mixed with ion-exchange water, thereby preparing a total of 10 types of negative electrode pastes. The prepared negative electrode pastes were applied to long copper foils (negative electrode current collector) in a band shape. These were heated, dried, and then subjected to roll press, thereby producing a total of 10 types of negative electrode sheets. Test examples with conductive materials; negative electrode active material:conductive material:thickener:binder=93:5:1:1 Test examples without conductive materials (reference examples); negative electrode active material:conductive material:thickener:binder=98:0:1:1

<Preparation of Non-Aqueous Electrolytic Solution>

First, ethylene carbonate (EC), dimethyl carbonate (DMC), and ethyl methyl carbonate (EMC) were mixed with each other to have a volume ratio of 3:4:3, thereby preparing a solvent. In the mixed solvent, $LiPF_6$ as the support salt was dissolved to have a concentration of 1.1 mol/L, thereby preparing a non-aqueous electrolytic solution.

<Construction of Battery>

First, as the separator sheet, a sheet in which a heat-resistant layer (4 μm) was provided on one surface of a porous resin sheet (with an average thickness of 20 μm) having a three-layer structure in which a polypropylene (PP) layer was laminated on both surfaces of a polyethylene (PE) layer was prepared. Next, the produced positive electrode sheet and the negative electrode sheet were laminated with the separator sheet interposed therebetween, thereby producing electrode bodies corresponding to 10 types of negative electrode sheets. At this time, the surface of the separator sheet on the heat-resistant layer side was allowed to face the negative electrode sheet. The electrode body was accommodated in a battery case, and the non-aqueous electrolytic solution was injected into the battery case. Accordingly, a total of 10 types of lithium-ion secondary batteries having different negative electrode configurations were constructed.

<Measurement of Initial Capacity>

In an environment at a temperature of 25° C., the initial capacity of the constructed batteries was measured. Specifically, in a voltage range of 3.0 V to 4.1 V, measurement was performed according to the following procedures 1 and 2. (Procedure 1) CC charging was performed to reach 4.1 V at a constant current of ⅓ C, and the battery was disconnected for 10 minutes. (Procedure 2) After CC discharging was performed to reach 3.0 V at a constant current of ⅓ C, CV discharging was performed until the current had reached 1/100 C or until the CV discharging time had passed 1.5 hours. In addition, in Procedure 2, the discharge capacity (CCCV discharge capacity) was set to the initial capacity (SOC 100%).

<Measurement of Low-Temperature Resistance>

First, in an environment at a temperature of 25° C., the battery was adjusted to a state of SOC 56%. The battery was moved to a thermostatic bath at −10° C. and was left for a while. After the temperature of the battery was stabilized, CC charging was performed for 10 seconds at each of rates of 1 C and 3 C. The relationship between the current and the amount of a voltage drop at this time was plotted on a graph, and the slope of the fitted line thereof was calculated as the low-temperature resistance (mΩ). The results are shown in Table 1. In addition, in Table 1, relative values when a test example in which the negative electrode satisfies the following conditions in which the conductive material was not contained and the average particle size Db of the binder was 300 nm was referred to as 100, are shown as the results.

<High-Temperature Storage Test>

First, in an environment at a temperature of 25° C., the battery was adjusted to a state of SOC 80%. The battery was moved to a thermostatic bath at 60° C. and was stored for 60 days. After the test was ended, the battery was taken out of the thermostatic bath, and the battery capacity was measured as in the case of the initial capacity. The battery capacity after the high-temperature storage test was divided by the initial capacity, thereby calculating a capacity retention ratio (%). The results are shown in Table 1. In addition, in Table 1, relative values when a test example in which the negative electrode satisfies the following conditions in which the conductive material was not contained and the average particle size Db of the binder was 300 nm was referred to as 100, are shown as the results.

TABLE 1

Average particle size of binder and battery characteristics

| Average particle size Db of binder (nm) | Db/De | Low-temperature resistance (relative value)* | | Capacity retention ratio (relative value)* | |
| --- | --- | --- | --- | --- | --- |
| | | (Reference examples) without conductive material | With conductive material | (Reference examples) without conductive material | With conductive material |
| 70 | 0.7 | 106 | 100 | 110 | 115 |
| 90 | 0.9 | 103 | 100 | 109 | 109 |
| 100 | 1 | 103 | 100 | 107 | 100 |
| 150 | 1.5 | 102 | 100 | 106 | 93 |
| 300 | 3 | 100 | 100 | 100 | 88 |

*Relative values when a result at Db = 300 nm without the conductive material is referred to as 100.

Figure 3:
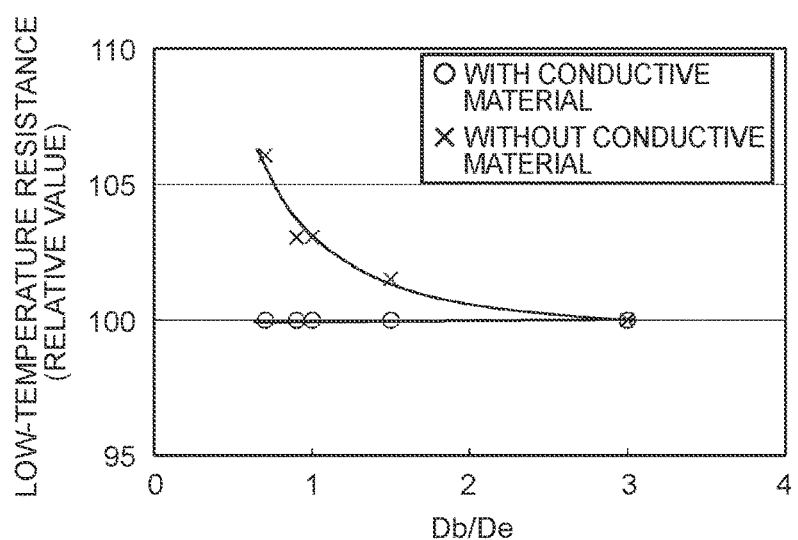
FIG. 3 is a graph showing the relationship between the ratio (Db/De) of the average particle size Db of a binder to the average particle size De of a conductive material and the low-temperature resistance of the battery.

FIG. 3 is a graph showing the relationship between the ratio (Db/De) of the average particle size Db of the binder to the average particle size De of the conductive material and the low-temperature resistance of the battery. As shown in Table 1 and FIG. 3, in test examples in which the conductive material was not contained in the negative electrode (test examples (reference examples) "without conductive material"), as Db/De had increased (that is, the average particle size Db of the binder had increased), the low-temperature resistance had decreased. It is thought that this is because as the particle size of the binder increases, the ratio of the surface of the negative electrode active material coated with the binder decreases. Contrary to this, in test examples in which the conductive material was contained in the negative electrode (test examples "with conductive material"), the low-temperature resistance had a constant value regardless of Db/De (that is, the average particle size Db of the binder). In addition, compared to the test examples (reference examples) in which the conductive material was not contained in the negative electrode, the low-temperature resistance was generally low.

Figure 4:
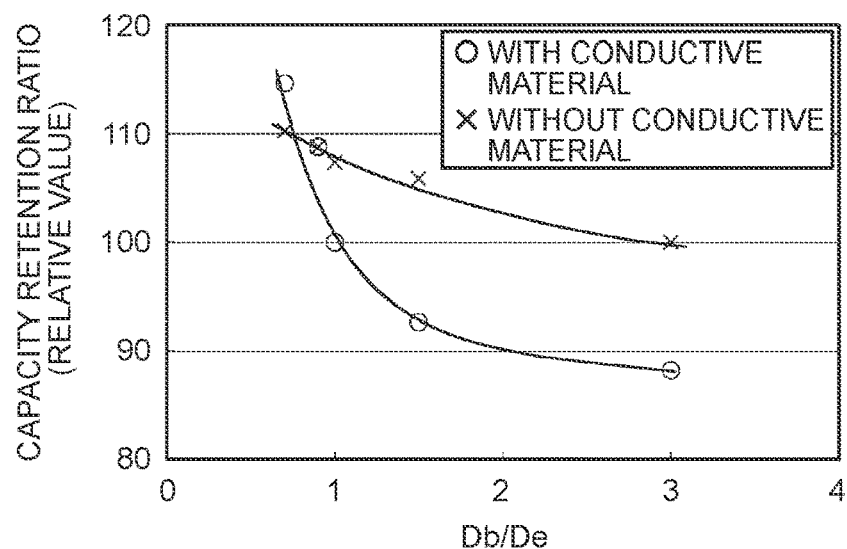
FIG. 4 is a graph showing the relationship between the ratio (Db/De) of the average particle size Db of the binder to the average particle size De of the conductive material and the capacity retention ratio of the battery.

FIG. 4 is a graph showing the relationship between the ratio (Db/De) of the average particle size Db of the binder to the average particle size De of the conductive material and the capacity retention ratio of the battery. As shown in Table 1 and FIG. 4, in the test examples in which the conductive material was not contained in the negative electrode (test examples (reference examples) "without conductive material"), as Db/De had increased (that is, the average particle size Db of the binder had increased), capacity deterioration after high-temperature storage became significant. It is thought that this is because as the particle size of the binder increases, the ratio of the surface of the negative electrode active material coated with the binder decreases. That is, it is thought that this is resulted from the acceleration of the reductive decomposition of the non-aqueous electrolyte on the surface of the negative electrode active material. In the test examples in which the conductive material was contained in the negative electrode (test examples "with conductive material"), compared to the test examples (reference examples) in which the conductive material was not contained in the negative electrode, the effect of Db/De (that is, the average particle size Db of the binder) was significant. It is thought that this is because, as the ratio of the average particle size Db of the binder to the average particle size De of the conductive material decreases, the surface of the conductive material is more easily coated with the binder.

From the above results, the low-temperature resistance is reduced by allowing the conductive material to be contained in the negative electrode. In addition, by allowing the average particle size Db of the binder in the negative electrode to be equal to or smaller than the average particle size De of the conductive material (that is, Db/De≤1), the capacity retention ratio (for example, high-temperature storage characteristics) after durability was enhanced. Due to the effects, according to the technique disclosed herein, a non-aqueous electrolyte secondary battery which can maintain and exhibit good battery characteristics (for example, input and output characteristics) over a long period of time (with high durability) is realized.

II. Evaluation of Peel Strength of Negative Electrode

<Production of Negative Electrode>

First, the amorphous carbon coated graphite, acetylene black, carboxymethylcellulose, and an acrylic binder (with an average particle size of 70 nm in an emulsion state containing a dispersion medium) were weighed to have a mass ratio of 93:5:1:1, and were mixed with ion-exchange water, thereby preparing a negative electrode paste. The prepared negative electrode paste was applied to one surface of a long copper foil (negative electrode current collector) in a band shape with coating amounts shown in Table 2. These were heated, dried, and then subjected to roll press, thereby producing a total of 5 types of negative electrode sheets.

<90-degree Peel Test>

A 90-degree peel test was performed according to "peel adhesion strength test" of JIS K 6854-1 (1999). That is, first, each of the negative electrode sheets was cut into a size of 1.5 cm×70 cm, thereby preparing test pieces. Next, the surface of the test piece on the negative electrode current collector side was fixed to the fixture of a tensile tester, and the surface of the negative electrode active material layer was fixed to a tension jig (clamp). In addition, the tension jig was pulled upward in the vertical direction at each of rates of 20 mm/min to 40 mm/min and the peel strength (N/m) when the negative electrode active material layer was peeled off from the negative electrode current collector was measured. In addition, the tensile strengths at the pulling rates were averaged, thereby obtaining the peel strength. The results are shown in Table 2.

TABLE 2

| Coating amount of negative electrode active material layer and peel strength | | | | | |
|---|---|---|---|---|---|
| Coating amount for one surface (mg/cm$^2$) | 3 | 3.5 | 4.3 | 5.2 | 7.8 |
| Peel strength (N/m) | 5 | 5 | 5 | 4 | 1 |

Figure 5:
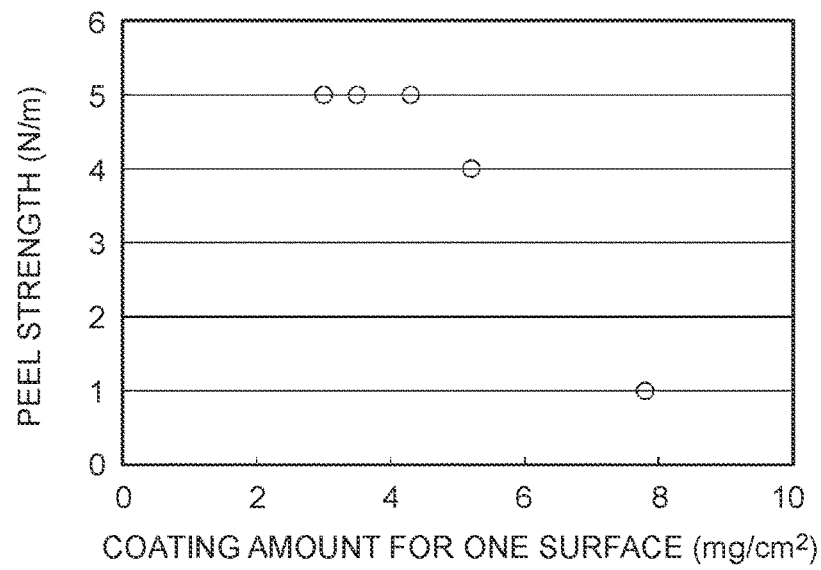
FIG. 5 is a graph showing the relationship between a coating amount for one surface and peel strength.

FIG. 5 is a graph showing the relationship between the coating amount for one surface of the negative electrode current collector and the peel strength. As shown in Table 2 and FIG. 5, a peel strength of 4 N/m or higher (preferably 5 N/m or higher) was realized when the coating amount for one surface of the negative electrode current collector was 5.2 mg/cm$^2$ or lower (preferably 4.3 mg/cm$^2$ or lower). When the coating amount for one surface exceeded 5.2 mg/cm$^2$, there was a tendency toward a reduction in peel strength. It is thought that this is because as the coating amount increases, the negative electrode active material layer becomes thick, and binder migration easily occurs on the surface layer portion of the negative electrode active material layer. From this, the technique disclosed herein can be particularly preferably applied to a non-aqueous electrolyte secondary battery provided with a negative electrode in a thin film shape, for example, an in-vehicle battery (particularly, a battery for a hybrid vehicle) which postulate a use in which rapid charge and discharge at a high current are performed.

While the invention has been described in detail, the embodiment and examples are only examples, and various modifications and changes of the specific examples described above are included in the invention disclosed herein.

What is claimed is:

1. A non-aqueous electrolyte secondary battery comprising:
    a positive electrode;
    a negative electrode; and
    a non-aqueous electrolyte, wherein
    the negative electrode contains a negative electrode active material, a conductive material, and a binder,
    the binder is at least one of a polymer or a copolymer;
    0.5≤(Db/De)≤0.9 is satisfied where an average particle size of the conductive material is De, and an average particle size of the binder is Db,
    Db is 90 nm or smaller,
    the average particle size of the conductive material is 180 nm or smaller, and
    the average particle size is a volume-based particle size measured based on a dynamic light scattering method.

2. The non-aqueous electrolyte secondary battery according to claim 1, wherein
    the negative electrode includes a negative electrode current collector and a negative electrode active material layer,
    the negative electrode active material layer contains the negative electrode active material, the conductive material, and the binder, and
    a peel strength between the negative electrode current collector and the negative electrode active material layer is 4 N/m or higher.

3. The non-aqueous electrolyte secondary battery according to claim 2, wherein a mass ratio between the conductive material and the binder is 4:1 to 6:1.

* * * * *